(12) United States Patent
Rackham

(10) Patent No.: US 6,619,715 B2
(45) Date of Patent: Sep. 16, 2003

(54) PILLAR SUPPORT STRUCTURE IN A LAND VEHICLE

(75) Inventor: Richard Alan Rackham, Norfolk (GB)

(73) Assignee: Aston Martin Lagonda Limited (GB)

( * ) Notice: Subject to any disclaimer, the term of this patent is extended or adjusted under 35 U.S.C. 154(b) by 0 days.

(21) Appl. No.: 10/203,309

(22) PCT Filed: Aug. 8, 2001

(86) PCT No.: PCT/GB01/03571
§ 371 (c)(1),
(2), (4) Date: Aug. 6, 2002

(87) PCT Pub. No.: WO02/12053
PCT Pub. Date: Feb. 14, 2002

(65) Prior Publication Data
US 2003/0011206 A1 Jan. 16, 2003

(30) Foreign Application Priority Data
Aug. 8, 2000 (GB) .............................. 0019478

(51) Int. Cl.$^7$ ............................ B62D 27/02; B62D 25/04
(52) U.S. Cl. .......................... 296/29; 296/194; 296/205; 296/203.02
(58) Field of Search ................. 296/29, 194, 203.01, 296/203.2, 203.03, 205, 210, 197, 193

(56) References Cited

U.S. PATENT DOCUMENTS

| | | | | |
|---|---|---|---|---|
| 3,061,360 A | * | 10/1962 | Wilfert | 296/205 |
| 3,127,213 A | * | 3/1964 | Klaasen | 296/197 |
| 4,730,870 A | * | 3/1988 | DeRees | 296/197 |
| 5,092,649 A | * | 3/1992 | Wurl | 296/185 |
| 5,372,400 A | * | 12/1994 | Enning et al. | 296/203.03 |
| 5,564,744 A | * | 10/1996 | Frost | 280/751 |
| 5,680,886 A | * | 10/1997 | Ohtsuka | 138/121 |
| 5,884,962 A | * | 3/1999 | Mattingly et al. | 296/189 |
| 6,073,991 A | * | 6/2000 | Naert | 296/197 |
| 6,217,109 B1 | * | 4/2001 | Okana et al. | 296/203.03 |
| 6,296,301 B1 | * | 10/2001 | Schroeder et al. | 296/193 |
| 6,493,920 B1 | * | 12/2002 | Hill et al. | 29/469 |
| 2001/0050497 A1 | * | 12/2001 | Jaekel et al. | 296/205 |

FOREIGN PATENT DOCUMENTS

| | | | |
|---|---|---|---|
| DE | 35 14 544 | 9/1986 | |
| DE | 4138370 A1 | * 6/1992 | ......... B62D/23/00 |
| DE | 4409466 A1 | * 10/1994 | ......... B62D/29/04 |
| DE | 195 19 354 | 11/1996 | |
| EP | 0399 648 | 11/1990 | |
| GB | 526159 | * 9/1940 | ............... 296/205 |
| GB | 2 049 567 | 12/1980 | |
| GB | 2 293 798 | 10/1996 | |
| GB | 2 317 858 | 8/1998 | |
| JP | 2-2000580 A | * 8/1990 | ............ 296/203.02 |
| WO | WO 96/39322 | 12/1996 | |

OTHER PUBLICATIONS

Marks' Standard Handbook for Mechanical Engineers, 10$^{th}$ Ed., 1996, pp. 6–146 to6–148 and Table 6.12.1.*

* cited by examiner

Primary Examiner—Joseph D. Pape
Assistant Examiner—Patricia L. Engle
(74) Attorney, Agent, or Firm—Luedeka, Neely & Graham

(57) ABSTRACT

The present invention relates to (with reference to FIG. 3) a land vehicle having a pillar (16) which is a structural component of the vehicle and which is secured in position by setting of a root portion of the pillar (16) in resinous material (20) provided in a cavity defined in a pillar support structure (15).

19 Claims, 4 Drawing Sheets

PILLAR SUPPORT STRUCTURE IN A LAND VEHICLE

The present invention relates to a land vehicle with the structure which comprises a pillar fixed in position in a novel manner.

The majority of land vehicles have pillars which are called "A" pillars. These are the pillars which extend either side of the front windscreen of a vehicle and which support the roof of the vehicle (if the vehicle has one), which can provide support for the door frames of the vehicle and which, most importantly, provide crush resistance which protects the integrity of the cabin of the vehicle in the event that the vehicle is rolled over on its roof.

Typically land vehicles are made of steel and the roof pillars are steel pillars which are welded to the remainder of the structure of the vehicle.

Carbon fibre composite components have structural properties which are preferable to the properties of steel and which are suited to an "A" pillar. However, it has always been considered that it is difficult to integrate carbon fibre composite "A" pillars with the remainder of the vehicle structure.

The present invention provides a land vehicle having a pillar which is a structural component of the vehicle and a pillar support structure, the pillar being a distinct independent component not formed integrally with any surrounding components of the land vehicle, wherein the pillar is secured in position by setting of a root portion of the pillar in resinous material provided in a cavity defined in the pillar support structure.

It is a novel approach to set in position an "A" pillar using a resin. Usually the "A" pillars are steel and are welded in position. Otherwise, an approach could be taken to produce an "A" pillar with a root portion which has a shape which matches very closely the shape of a socket defined in its support structure, the root portion being slotted into the socket and perhaps adhered in position using an adhesive. However, this involves considerable expense in producing a correctly placed socket and it is not possible to adopt this approach without constraining to some degree the shape of the root portion of the "A" pillar, because the root portion must slide into a matching socket. This is not ideal. To avoid all of these problems, the "A" pillar of the present invention is set in place in resin, the resin being present in a cavity which is significantly larger in cross-section than the cross section of the "A" pillar.

Preferably the resinous material comprises an epoxy resin. However, the resinous material could equally well comprise a polyurethane resin.

Preferably the resinous material comprises hollow microspheres dispersed in a resin matrix. Preferably the hollow microspheres are glass microspheres. A block of resin of significant volume can be quite heavy. This is disadvantageous. In order to ameliorate this disadvantage it is preferred that microspheres are dispersed in the resinous material, in order to reduce the density of the resinous material and thereby reduce the overall weight of the block of resin used to set the "A" pillar.

Alternatively, the resinous material could comprise epoxy resin mixed with particulate silica. The use of particulate silica has an advantage during curing of the resin. The curing is an exothermic process and the silica helps keep the overall temperature to levels which avoid problems of stresses and cracking caused by thermal expansion and subsequent contraction.

As mentioned above, the pillar will preferably have a cross-section which varies along the length thereof, but for simplicity the cavity will generally have a constant cross-section along its length.

By choosing the cross-section of the cavity to be sufficiently large the invention can permit a situation in which the cavity has a principal axis and the pillar is set at an angle to the principal axis. This avoids the need for a socket machined at the particular angle in order to ensure correct positioning of the "A" pillar extending therefrom.

Preferably, the pillar comprises fibres set in a resin matrix. Preferably the pillar has a core of foamed material around which the fibres are wound with the core being encased by the resin matrix. The use of a core increases the overall weight of the pillar without reducing significantly its structural abilities.

Preferably the fibres used for the pillar are carbon fibres.

Preferably the land vehicle has an aluminium chassis and the pillar is an "A" pillar of the vehicle which is set in a cavity defined in the aluminium chassis. It would be particularly pertinent to use the present invention when the aluminium chassis is made of extruded components glued together. It would be easy to define the cavity by using an extrusion.

Preferably the land vehicle has as pair of pillars spaced apart one each side of a windscreen, the pair of pillars being secured in position one each in a pair of spaced apart cavities, the pillars providing crush resistance in the event of the land vehicle rolling over.

Preferably the land vehicle also comprises a crush tube mounted adjacent to the pillar and covered in a flexible material, the crush tube being located to prevent the head of an occupant of the land vehicle hitting directly a pillar in the event of a vehicle collision, the crush tube deforming to absorb impact energy in such an event.

In one embodiment the crush tube is an aluminium crush tube and in a second embodiment the crush tube is a cardboard crush tube. Preferably the crush tube is covered by a sheet of ABS plastic material.

The present invention also provides a method of manufacture of the land vehicle described above in which the pillar is positioned with the root portion thereof extending into the cavity in the pillar support structure, the resinous material in liquid state is poured into the cavity surrounding the root portion of the pillar, the resinous material is cured and the cured resinous material then secures the pillar in position.

Where the pillar has a core of foamed material it is preferably formed by first of all forming the core of foamed material in a desired shape with a cross-section which varies lengthwise along the core, then winding the fibres around the core of foamed material, setting the wound fibres in a resin matrix and thereby encasing the core of foamed material.

A preferred embodiment of the present invention will now be described with reference to the accompanying drawings in which.

Figure 1:
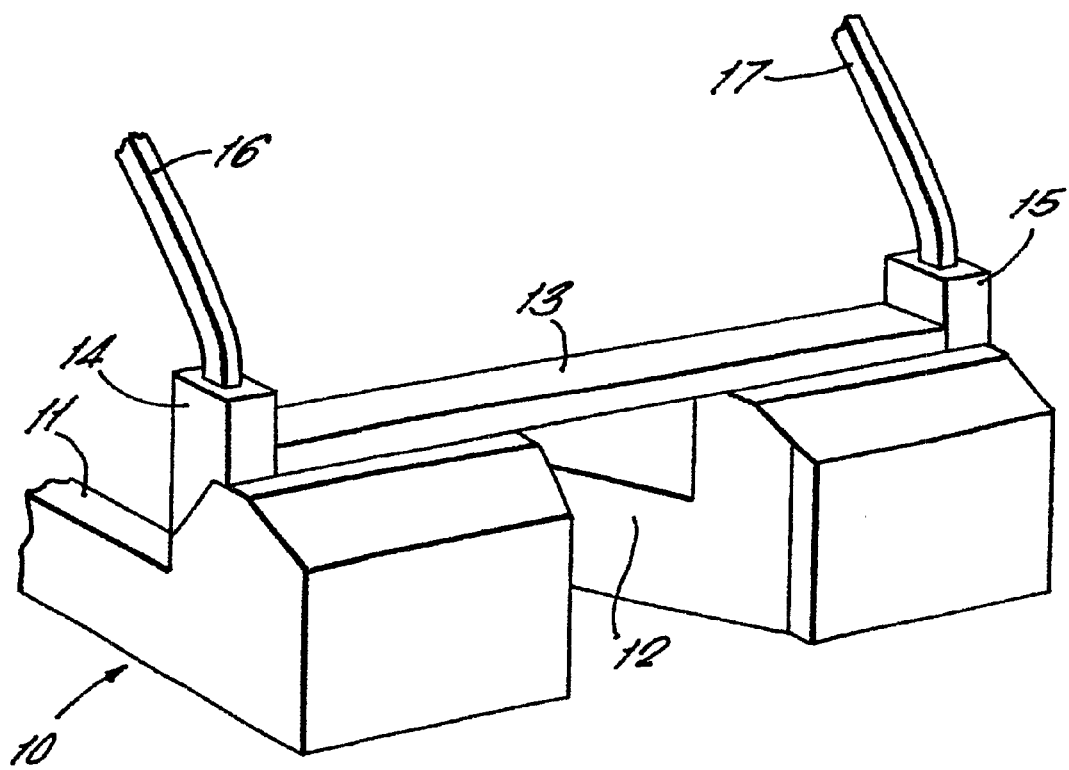
FIG. 1 is a schematic representation of the front of a land vehicle (stripped of bodywork) according to the present invention.

Turning first to FIG. 1 there can be seen in this figure a land vehicle chassis 10. Only part of the chassis is shown. The chassis shown is made from aluminium extrusions which are adhered together. The front end of the chassis is shown. Extending from the front end of the chassis there will be mounts for wheels and for an engine (such mounts and components not shown). The part of the chassis shown defines the passenger cell compartment of vehicle.

The chassis 10 has two sills 11 and 12 and a crossmember 13. The chassis 10 also has two pillar support structures 14 and 15 for supporting two "A" pillars 16 and 17. The "A" pillars 16 and 17 are pillars which extend one either side of the windscreen (not shown) of the vehicle. The "A" pillars 16, 17 provide crush resistance protecting the passenger cabin in the event that the land vehicle rolls over. The "A" pillars 16, 17 also serve to support the roof of the vehicle and the door frames of the vehicle.

Figure 4:
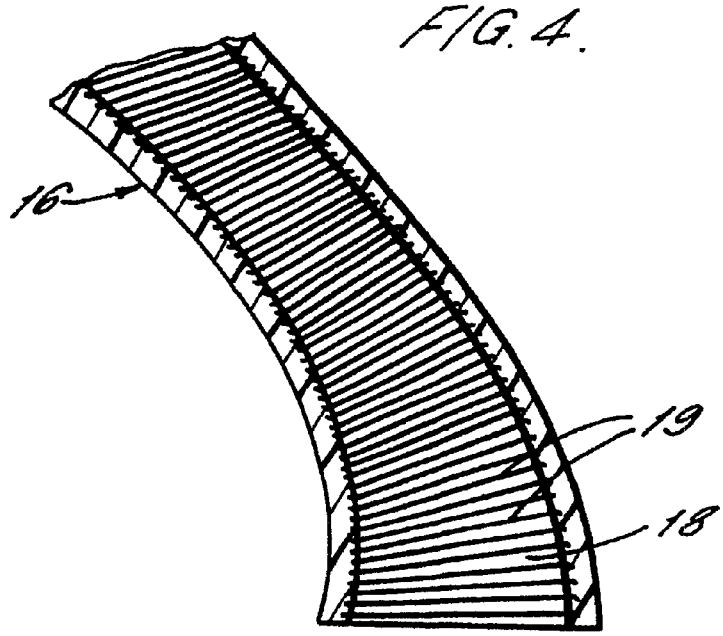
FIG. 4 is a schematic representation of a pillar of a land vehicle according to the present invention, as illustrated in FIGS. 1 to 3.

In the preferred embodiment the pillars 16 and 17 are each carbon fibre composite pillars. One of the pillars 16 is shown in FIG. 4. The pillar comprises a core 18 of a foamed material. The core 18 is formed with a cross-section which varies lengthwise along the core. The cross-section varies in such a way that the cross-section at the root portion of the foamed core is greater in area than the cross-section of the foamed core at the tip portion.

The pillar 16 is manufactured by winding carbon fibres 19 around the core 18 of foamed material. The carbon fibre 19 used is braided carbon fibre. Once the braided carbon fibre 19 has been wound around the core 18 of foamed material then the cores 18 with the wound carbon fibres 19 are placed in a mould and a resin, e.g. an epoxy resin is poured into the mould and is then cured. The carbon fibres 19 are therefore set in a resin matrix with the core 18 encased in the resin.

In a further embodiment the pillar 16 will include a mixture of bonded fibres wound around the foam core and longitudinal fibres running along the length of the foam core.

Figure 3:
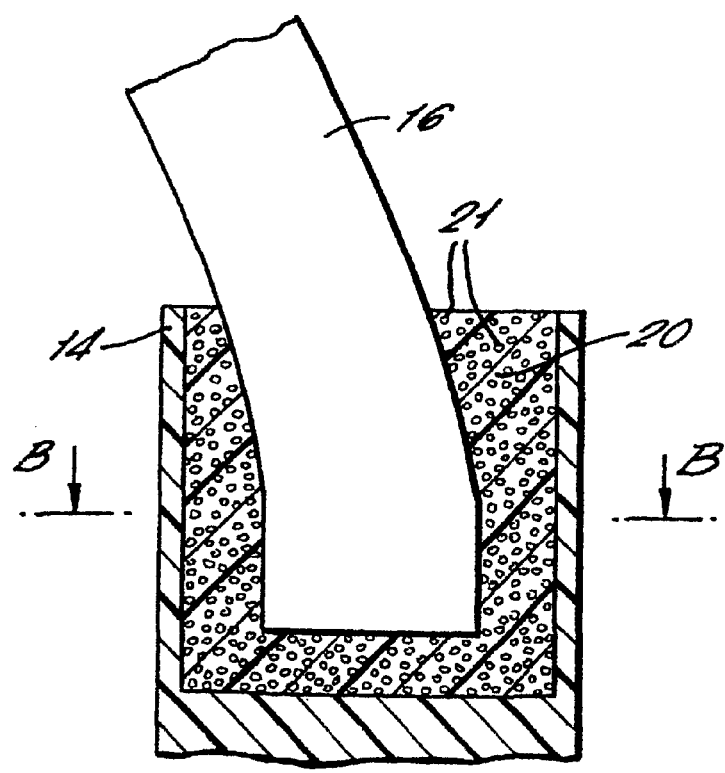
FIG. 3 is a cross-section through a pillar and a pillar support structure of a land vehicle according to a first embodiment of the present invention, the cross-section being taken along the line A—A shown in FIG. 2, in the direction of the arrow.

Once the pillar 16 is formed then it is positioned (e.g. using a jig) with its root portion extending into a cavity defined in the pillar support structure 14. In FIG. 3 the root portion of the pillar 16 can be seen positioned in a cavity defined by the pillar support structure 14.

Once the root portion of the pillar 16 has been positioned, then a resinous material in a liquid state is poured into the cavity and then cured. The resinous material which is poured into the cavity and cured secures the pillar 16 in place. The pillar 16 is secured firmly in place at the correct angle.

It will be appreciated that the cross-section of the pillar 16 varies continuously along its length. The use of resinous material in the manner described above obviates the need to produce a socket of matched configuration which would not be possible. It will also be noted that the pillar 16 can be set at an angle without needing to provide a correctly angled socket.

In a first embodiment (see FIG. 3) the resinous material 20 used to set the pillar 16 in position comprises a polyurethane resin and also a plurality of hollow glass microspheres 21. The hollow glass microspheres are interspersed in the polyurethane resin. The polyurethane resin in the cavity in the pillar support 14 will have a significant volume. If the resinous material comprises pure resin then the weight of the block of resin will be significant. The use of hollow microspheres reduces the density of the resinous mixture and thereby reduces the overall weight of the block of resinous mixture. This is achieved without significantly affecting the physical properties of the resin. This is advantageous. Preferably the polyurethane resin will be sealed to prevent the resin absorbing water (e.g. rain water), which could affect the properties of the resin.

Figure 6:
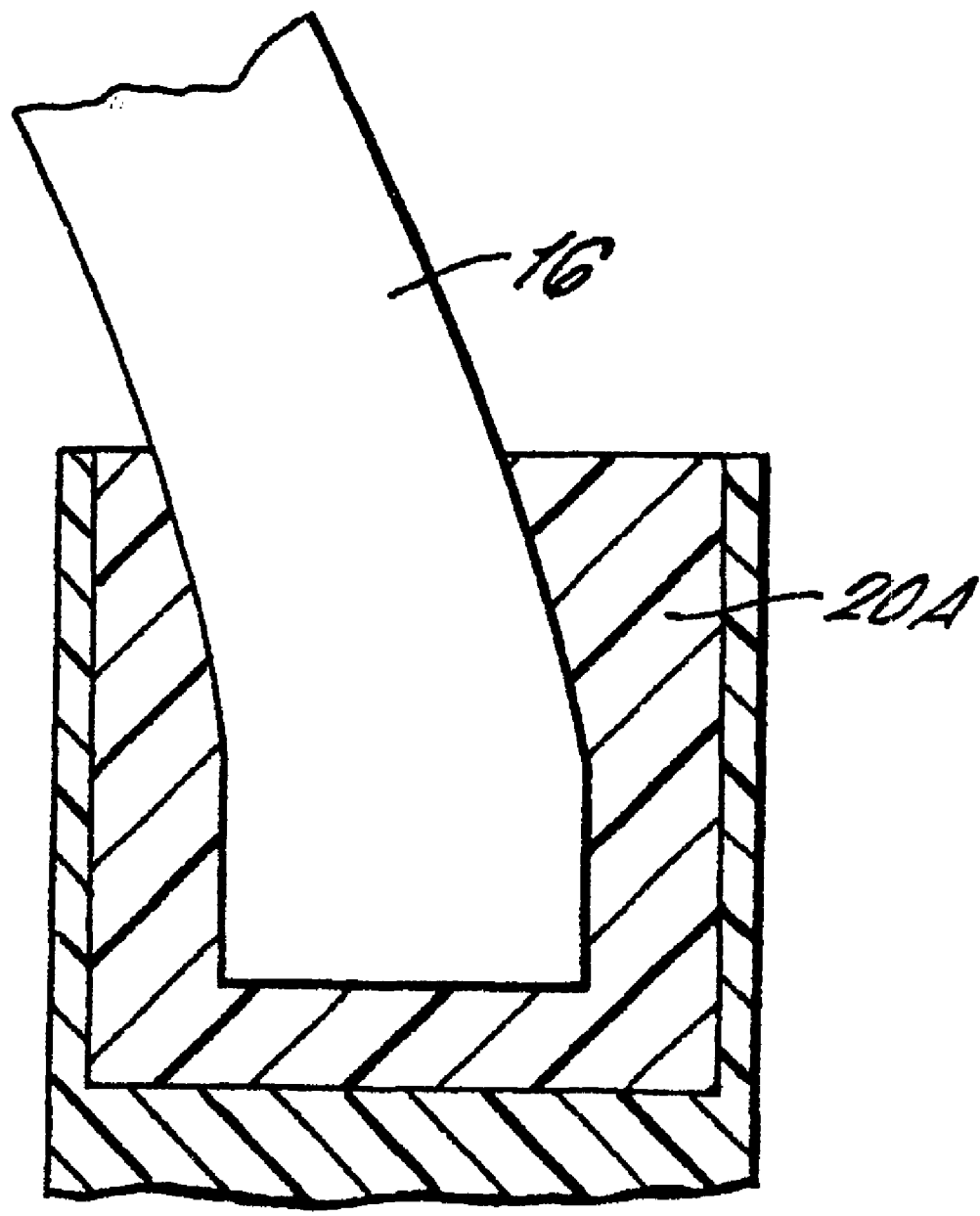
FIG. 6 is a cross-section through a pillar and a pillar support structure of a land vehicle according to a second embodiment of the present invention, the cross-section along the line A—A shown in FIG. 2, in the direction of the arrow.

In a second embodiment (see FIG. 6) the resinous material 20A used to set the pillar 16 in position comprises a mixture of epoxy resin and silica particulates. The use of silica reduces problems of thermal stresses and strains which arise during curing of the epoxy resin, an exothermic reaction.

Figure 2:
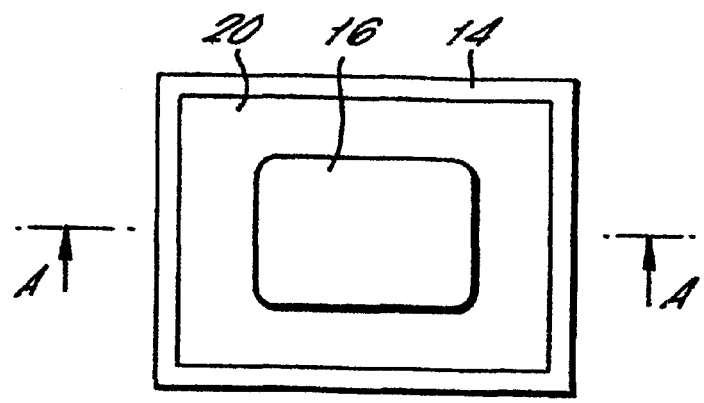
FIG. 2 is a cross-section through a pillar support section of a chassis of a land vehicle as shown in FIG. 1, the cross-section being taken through the line B—B shown in FIG. 3 in the direction of the arrow shown in FIG. 3.

FIG. 2 shows a cross-section taken along the line B—B in FIG. 3 and it can be seen that the pillar 16 is set in position in the resinous material 20 contained in a cavity defined by the aluminium extrusion forming the pillar support structure 14.

Whilst the above description has related to the pillar 16, it should be appreciated that the description is equally applicable to the pillar 17.

Figure 5:
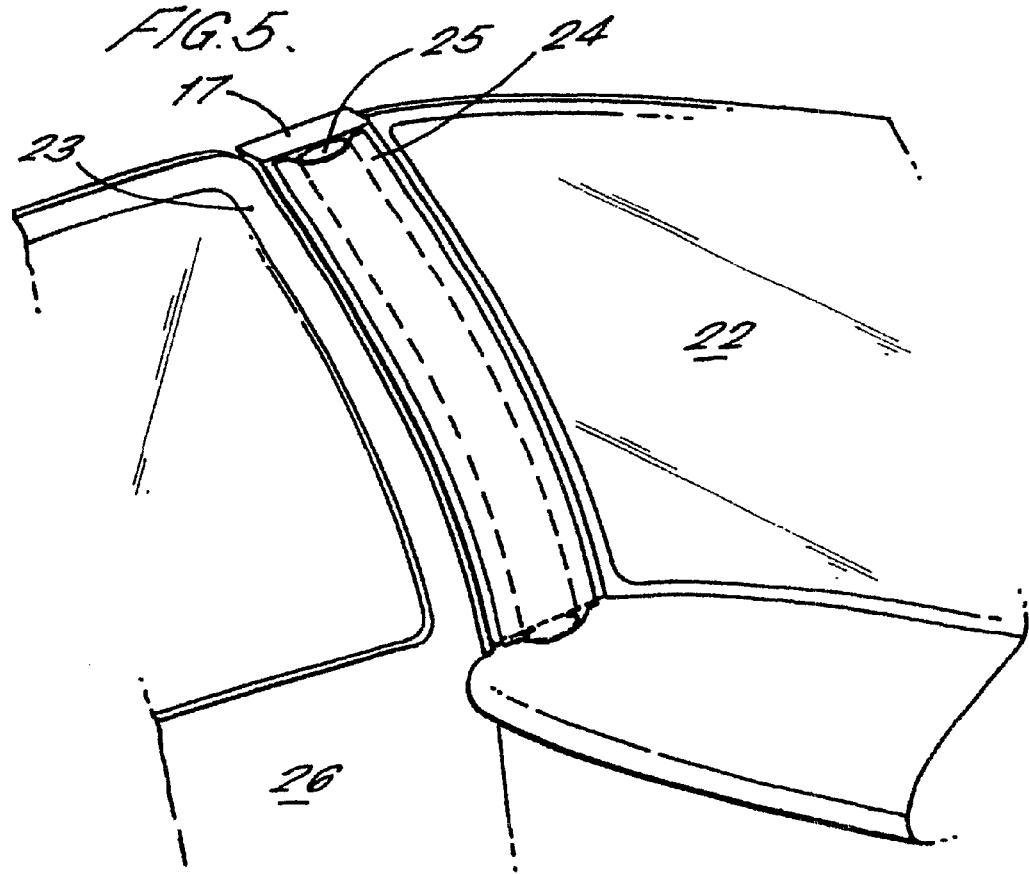
FIG. 5 is a schematic illustration of an interior of a land vehicle cabin according to the present invention.

In FIG. 5 there is a schematic illustration of how the pillar 17 will look from the interior of the vehicle in use. The pillar 17 is located between the windscreen 22 and the door frame 23 of a door 26. An interior surface is provided by a layer of ABS material 24 which is wrapped around the pillar 17. Enclosed and sandwiched between the pillar 17 and the outer layer of ABS material 24 is a crush tube 25. The crush tube 25 is typically a hollow corrugated tube of aluminium or of cardboard or of cardboard and aluminium. The crush tube 25 will be a hollow member. The crush tube 25 is located in such a position that it will prevent the head of an occupant of a land vehicle hitting directly the pillar 17 in the event of a vehicle collision. The crush tube 25 will deform to absorb impact energy when there is a crash.

What is claimed is:

1. A land vehicle having a pillar which is a structural component of the land vehicle and a pillar support structure, the pillar being a distinct independent component not formed integrally with any surrounding components of the land vehicle, wherein the pillar is secured in position by setting of a root portion of the pillar in resinous material provided in a cavity defined in the pillar support structure, with the resinous material poured in a liquid state into the cavity and then cured to secure the pillar firmly in place.

2. A land vehicle as claimed in claim 1 wherein the resinous material comprises an epoxy resin.

3. A land vehicle as claimed in claim 1 wherein the resinous material comprises a polyurethane resin.

4. A land vehicle as claimed in claim 1 wherein the resinous material comprises hollow microspheres dispersed in a resin.

5. A land vehicle as claimed in claim 4 wherein the hollow microspheres are glass microspheres.

6. A land vehicle as claimed in claim 1 wherein the cavity has a constant cross-section along the length thereof and the pillar has a cross-section which varies along the length thereof.

7. A land vehicle as claimed in claim 1 wherein the cavity has a principal axis and the pillar is set at an angle to the principal axis.

8. A land vehicle as claimed in claim 1 wherein the pillar comprises fibres set in a resin matrix.

9. A land vehicle as claimed in claim 8 wherein the pillar has a core of foamed material around which the fibres are wound with the core being encased by the resin matrix.

10. A land vehicle as claimed in claim 8 wherein the fibres are carbon fibres.

11. A land vehicle as claimed in claim 8 wherein the fibres are braided fibres.

12. A land vehicle as claimed in claim 1 wherein the land vehicle has an aluminium chassis and the pillar is an "A" pillar of the vehicle which is set in the cavity, the cavity being a cavity defined in the aluminium chassis.

13. A land vehicle as claimed in claim 1 which has a pair of pillars spaced apart on each side of a windscreen, the pair of pillars being secured in position one each in a pair of spaced apart cavities by setting root portions of the pillars in resinous material provided in the cavities, the pillars providing crush resistance in the event of the land vehicle rolling over.

14. A land vehicle as claimed in claim 1 comprising additionally a crush tube mounted adjacent the pillar and covered in a flexible material, the crush tube being located to prevent a head of an occupant of the land vehicle hitting directly the pillar in the event of a vehicle collision, the crush tube deforming to absorb impact energy in such an event.

15. A land vehicle as claimed in claim 14 wherein the crush tube is an aluminium crush tube.

16. A land vehicle as claimed in claim 14 wherein the crush tube is a cardboard crush tube.

17. A land vehicle as claimed in claim 14 wherein the crush tube is covered by a sheet of ABS plastic material.

18. A method of manufacture of a land vehicle as claimed in claim 1 wherein the pillar is positioned with the root portion thereof extending into the cavity in the pillar support structure;

the resinous material in liquid state is poured into the cavity surrounding the root portion of the pillar;

the resinous material is cured; and the cured resinous material secures the pillar in position.

19. A method of manufacture of a land vehicle as claimed in claim 18 which comprises the steps of:

forming the pillar as a core of foamed material in a desired shape with a cross-section which varies lengthwise along the core;

winding fibres around the core of foamed material; and setting the wound fibres in a resin matrix and thereby encasing the core of foamed material.

\* \* \* \* \*